(12) United States Patent
Lee

(10) Patent No.: US 8,034,158 B2
(45) Date of Patent: Oct. 11, 2011

(54) METHOD OF MANUFACTURING FE AND NI CONTAINING MATERIAL, FERRONICKEL MASS USING THE FE AND NI CONTAINING MATERIAL AND METHOD FOR MANUFACTURING THE FERRONICKEL MASS

(75) Inventor: Jae Young Lee, Pohang (KR)

(73) Assignee: Research Institute of Industrial Science & Technology, Kyungsangbook-do (KR)

( * ) Notice: Subject to any disclaimer, the term of this patent is extended or adjusted under 35 U.S.C. 154(b) by 55 days.

(21) Appl. No.: 12/600,107

(22) PCT Filed: May 15, 2008

(86) PCT No.: PCT/KR2008/002701
§ 371 (c)(1),
(2), (4) Date: Nov. 13, 2009

(87) PCT Pub. No.: WO2008/140265
PCT Pub. Date: Nov. 20, 2008

(65) Prior Publication Data
US 2010/0242678 A1    Sep. 30, 2010

(30) Foreign Application Priority Data

May 15, 2007 (KR) .................. 10-2007-0047134
Nov. 8, 2007 (KR) .................. 10-2007-0113771

(51) Int. Cl.
*C22B 7/00* (2006.01)
*C22B 1/14* (2006.01)
*C22B 3/44* (2006.01)

(52) U.S. Cl. ............ 75/739; 75/770; 210/710; 210/722; 210/724; 423/144

(58) Field of Classification Search .................. 75/739, 75/770–772; 210/710, 721, 722, 724; 423/144
See application file for complete search history.

(56) References Cited

U.S. PATENT DOCUMENTS

| | | | | |
|---|---|---|---|---|
| 4,123,257 A | * | 10/1978 | Fukuoka et al. | 75/500 |
| 5,035,807 A | * | 7/1991 | Maree | 210/711 |
| 5,427,691 A | * | 6/1995 | Kuyucak et al. | 210/713 |
| 7,585,350 B2 | * | 9/2009 | Duarte et al. | 75/430 |

FOREIGN PATENT DOCUMENTS

| | | |
|---|---|---|
| JP | 2004-284848 | 10/2004 |
| KR | 10-2000-0040943 | 7/2000 |
| KR | 2000-199018 | 7/2000 |
| KR | 10-2004-0052844 | 6/2004 |
| KR | 10-0545394 | 6/2005 |
| KR | 10-0672089 | 1/2007 |
| WO | WO-2008075879 A1 * | 6/2008 |

OTHER PUBLICATIONS

International Search Report for corresponding application No. PCT/KR2008/002701 dated Oct. 8, 2008.

* cited by examiner

*Primary Examiner* — Roy King
*Assistant Examiner* — Tima M McGuthry Banks
(74) *Attorney, Agent, or Firm* — Renner, Otto, Boisselle & Sklar, LLP

(57) ABSTRACT

There are provided a method of manufacturing an Fe/Ni-containing material having a low content of sulfur (S) from an Fe/Ni/SO$_4$-containing liquid waste, a ferronickel mass using the Fe/Ni-containing material, and a method of manufacturing the ferronickel mass. The method of manufacturing an Fe/Ni-containing material from an Fe/Ni-containing liquid waste includes: removing SO$_4$ from an Fe/Ni/SO$_4$-containing liquid waste by adding an SO$_4$ neutralizing agent to the liquid waste so that pH of the liquid waste can be maintained to a pH level of 0.5 to 2.5; precipitating Fe and Ni in the form of hydroxide [(Ni,Fe)(OH)] by adding NaOH to the SO$_4$-free solution; washing the precipitate with water; and manufacturing an Ni/Fe-containing material by filtering and drying the washed Ni/Fe-containing sludge. The method of manufacturing an Fe/Ni-containing material may be useful to suitably apply to the field of recycling of waste acids since an Fe/Ni-containing pellet and a high purity plaster are recovered as the stainless steel material from the waste water at the same time.

14 Claims, No Drawings

METHOD OF MANUFACTURING FE AND NI CONTAINING MATERIAL, FERRONICKEL MASS USING THE FE AND NI CONTAINING MATERIAL AND METHOD FOR MANUFACTURING THE FERRONICKEL MASS

This application is a national phase of International Application No. PCT/KR2008/002701 filed May 15, 2008 and published in the English language.

TECHNICAL FIELD

The present invention relates to a method of recycling Fe/Ni-containing waste acids, and more particularly, to a method of manufacturing an Fe/Ni-containing material from an Fe/Ni/$SO_4$-containing liquid waste, a ferronickel mass using the Fe/Ni-containing material, and a method of manufacturing the ferronickel mass.

BACKGROUND ART

Waste acids containing Fe, Ni and $SO_4$ are generated when metal components (nickel (Ni), iron (Fe)) are treated with sulfuric acid in the method of manufacturing diamond.

In general, the liquid waste generated in the method of manufacturing diamond includes 1 to 2% of Ni, 3 to 6% of Fe, and 30 to 40% of $SO_4$.

When Fe and Ni are present in the liquid phase, there is proposed a method of separating Fe and Ni in the form of FeOOH and NiO and recovering the Fe and Ni as an alternative to recycle Ni (Korean Patent Application No. 1998-56697, Registered Patent No. 0406367)

The above-mentioned method of recycling an Fe/Ni sludge will be described in detail, as follows.

That is to say, an iron chloride ($FeCl_2$)/nickel chloride ($NiCl_2$)-containing aqueous solution is prepared by dissolving an Fe/Ni-containing sludge in hydrochloric acid so that the aqueous solution can be adjusted to pH 3 to 4, and $FeCl_2$ is oxidized into $FeCl_3$ by blowing air or hydrogen into the chlorides-containing aqueous solution.

Next, the generated $FeCl_3$ reacts in water at pH 3 to 5 to form an orange iron hydroxide (FeOOH) core, and an iron hydroxide sludge is formed by adding alkali to the iron hydroxide (FeOOH) core under the oxidation atmosphere so that the solution can be maintained up to twice mole of Fe in the solution, and to pH 3 to 5.

Then, the formed iron hydroxide sludge is filtered to separate an $NiCl_2$-containing filtrate from the iron hydroxide sludge, and the iron hydroxide sludge is then washed to obtain an iron hydroxide.

Finally, a nickel hydroxide precipitate is formed by adding alkali to the separated filtrate so that the filtrate can be maintained to pH 10 or more, and the nickel hydroxide precipitate is filtered, and washed to obtain nickel hydroxide.

However, the method of recovering and recycling iron hydroxide and nickel hydroxide as described above may apply only to chlorides.

That is to say, Fe and Ni are relatively easily separated from an $FeCl_2$/$NiCl_2$ aqueous solution, but when slaked lime as alkali is added to an $SO_4$-rich solution, a large amount of Ni is lost in the process of removal of Fe, which leads to the very low Ni recovery rate in the manufacture of nickel hydroxide.

In order to employ the Fe/Ni-containing material which is obtained from the liquid waste as a raw material of stainless steel, the Fe/Ni-containing sludge is also subject to the drying and sintering processes, but the Fe/Ni-containing sludge may be degraded in these processes.

Therefore, in order to employ the Fe/Ni-containing material as the stainless steel material, it is necessary to agglomerate the Fe/Ni-containing material into a pellet and the like.

In order to realize a desired strength of an agglomerated mass for raw material of stainless steel according to the solidification method using powder of the Fe/Ni-containing material prepared according to the above-mentioned method, the Fe/Ni-containing material is milled into powder, and the powder may be agglomerated by adding an agglomerant additive to the powder of the Fe/Ni-containing material, and mixing and molding them.

However, the initial moisture content and the initial curing strength of the pellet are highly varied according to the resulting Fe/Ni-containing sludge.

In particular, when an FeNi sludge in an aqueous solution is formed through the wet reaction, the problem is that a short-term curing moisture content of the FeNi sludge is high and a short-term curing strength of the FeNi sludge is very low in the agglomeration (pelletizing) process.

Therefore, the curing time may be extended long when a mass, for example a pellet, for a stainless steel material is manufactured using the Ni-containing wet sludge as the stainless steel material.

DISCLOSURE OF INVENTION

Technical Problem

An aspect of the present invention provides a method of manufacturing an Fe/Ni-containing material at a high recovery rate from an Fe/Ni/$SO_4$-containing liquid waste, the Fe/Ni-containing material having a low content of sulfur (S); a ferronickel mass using the Fe/Ni-containing material; and a method of manufacturing the ferronickel mass.

Another aspect of the present invention also provides a ferronickel mass manufactured using the Fe/Ni-containing material, the ferronickel mass having a high short-term curing strength, a low moisture content and a high Ni content; and a method of manufacturing the ferronickel mass.

Technical Solution

Hereinafter, exemplary embodiments of the present invention will be described in detail.

According to an aspect of the present invention, there is provided a method of manufacturing an Fe/Ni-containing material from an Fe/Ni-containing liquid waste, including:

preparing an Fe/Ni/$SO_4$-containing liquid waste;

neutralizing and removing $SO_4$ from the liquid waste by adding an $SO_4$ neutralizing agent to the liquid waste so that pH of the liquid waste is maintained to pH 0.5 to 2.5;

precipitating Fe and Ni in the form of hydroxide [(Ni,Fe)$(OH)_2$] by adding NaOH to the $SO_4$-free solution;

washing the precipitate with water; and manufacturing an Ni/Fe-containing material by filtering and drying the washed Ni/Fe-containing sludge.

According to another aspect of the present invention, there is provided a method of manufacturing an Fe/Ni-containing material from an Fe/Ni-containing liquid waste, including:

preparing an Fe/Ni/$SO_4$-containing liquid waste in which a value of [Fe(+3) ion concentration]/[Ni ion concentration+Fe (+2) ion concentration] is 1 or less;

removing $SO_4$ from the liquid waste by adding an $SO_4$ neutralizing agent to the liquid waste so that pH of the liquid waste is maintained to pH 0.5 to 4.5;

precipitating Fe and Ni in the form of hydroxide [(Ni,Fe)(OH)$_2$] by adding NaOH to the SO$_4$-free solution;

washing the precipitate with water; and manufacturing an Ni/Fe-containing material by filtering and drying the washed Ni/Fe-containing sludge.

According to still another aspect of the present invention, there is provided a ferronickel mass including an Ni/Fe-containing sludge manufactured by removing SO$_4$ by adding an SO$_4$ neutralizing agent to an Fe/Ni/SO$_4$-containing liquid waste so that pH of the Fe/Ni/SO$_4$-containing liquid waste can be maintained to a pH level of 0.5 to 2.5, precipitating Fe and Ni in the form of hydroxide [(Ni,Fe)(OH)$_2$] by adding NaOH to the SO$_4$-free solution, washing the precipitate with water, and drying the washed precipitate; and 10 to 20 parts by weight of a binder on the basis of 100 parts by weight of the dry sludge.

The ferronickel mass may further include a reducing agent.

When the binder is cement, the ferronickel mass may further include 10 to 100 parts by weight of an austenitic stainless scale on the basis of 100 parts by weight of the dry sludge.

The ferronickel mass may preferably include 4% by weight or more, and more preferably 8% by weight or more of Ni.

According to still another aspect of the present invention, there is provided a method of manufacturing a ferronickel mass using an Fe/Ni-containing sludge manufactured through a wet reaction, including:

preparing a blended material by blending an Ni/Fe-containing sludge manufactured by removing SO$_4$ by adding an SO$_4$ neutralizing agent to an Fe/Ni/SO$_4$-containing liquid waste so that pH of the Fe/Ni/SO$_4$-containing liquid waste can be maintained to a pH level of 0.5 to 2.5, precipitating Fe and Ni in the form of hydroxide [(Ni,Fe)(OH)$_2$] by adding NaOH to the SO$_4$-free solution, washing the precipitate with water, and drying the washed precipitate, and 10 to 20 parts by weight of a binder on the basis of 100 parts by weight of the dry sludge; and agglomerating the blended material while adding moisture to the blended material.

The blended material may further include a reducing agent.

When the binder is cement, the blended material may further include 10 to 100 parts by weight of an austenitic stainless scale on the basis of 100 parts by weight of the dry sludge.

The ferronickel mass prepared in the above method may preferably include 4% by weight or more, and more preferably 8% by weight or more of Ni.

According to still another aspect of the present invention, there is provided a ferronickel mass including an Ni/Fe-containing sludge manufactured by removing SO$_4$ by adding an SO$_4$ neutralizing agent to an Fe/Ni/SO$_4$-containing liquid waste in which a value of [Fe(+3) ion concentration]/[Ni ion concentration+Fe(+2) ion concentration] is 1 or less, so that pH of the Fe/Ni/SO$_4$-containing liquid waste can be maintained to a pH level of 0.5 to 4.5, precipitating Fe and Ni in the form of hydroxide [(Ni,Fe)(OH)$_2$] by adding NaOH to the SO$_4$-free solution, washing the precipitate with water, and drying the washed precipitate; and 10 to 20 parts by weight of a binder on the basis of 100 parts by weight of the dry sludge.

The ferronickel mass may further include a reducing agent.

When the binder is cement, the ferronickel mass may further include 10 to 100 parts by weight of an austenitic stainless scale on the basis of 100 parts by weight of the dry sludge.

The ferronickel mass may preferably include 4% by weight or more, and more preferably 8% by weight or more of Ni.

According to yet another aspect of the present invention, there is provided a method of manufacturing a ferronickel mass using an Fe/Ni-containing sludge manufactured through a wet reaction, including: preparing a blended material by blending an Ni/Fe-containing sludge manufactured by removing SO$_4$ by adding an SO$_4$ neutralizing agent to an Fe/Ni/SO$_4$-containing liquid waste in which a value of [Fe(+3) ion concentration]/[Ni ion concentration+Fe(+2) ion concentration] is 1 or less, so that pH of the Fe/Ni/SO$_4$-containing liquid waste can be maintained to a pH level of 0.5 to 4.5, precipitating Fe and Ni in the form of hydroxide [(Ni,Fe)(OH)$_2$] by adding NaOH to the SO$_4$-free solution, washing the precipitate with water, and drying the washed precipitate, and 10 to 20 parts by weight of a binder on the basis of 100 parts by weight of the dry sludge; and agglomerating the blended material while adding moisture to the blended material.

The ferronickel mass may further include a reducing agent.

When the binder is cement, the blended material may further include 10 to 100 parts by weight of an austenitic stainless scale on the basis of 100 parts by weight of the dry sludge.

The ferronickel mass may preferably include 4% by weight or more, and more preferably 8% by weight or more of Ni.

Advantageous Effects

As described above, the method of manufacturing an Fe/Ni-containing material may be useful to suitably apply to the field of recycling of waste acids since an Fe/Ni-containing pellet and a high purity plaster are recovered as the stainless steel material from the waste water at the same time.

Also, the method of manufacturing an Fe/Ni-containing material may be useful to provide a ferronickel mass with high productivity since it is possible to effectively manufacture an Fe/Ni mass that satisfies a desired purity, such as Ni concentration, of a final product, as well as a desired physical properties such as short-term curing strength (short-term curing strength within 5 days) and moisture content (moisture content of a pellet cured within 5 days) in the process of forming a ferronickel mass using an Fe and Ni sludge.

BEST MODE FOR CARRYING OUT THE INVENTION

Hereinafter, exemplary embodiments of the present invention will be described in more detail.

An Fe/Ni/SO$_4$-containing liquid waste is necessarily prepared to manufacture an Fe/Ni-containing material from the Fe/Ni-containing liquid waste according to the present invention.

Next, SO$_4$ is neutralized and removed off by adding an SO$_4$ neutralizing agent to the liquid waste so that pH of the liquid waste can be adjusted to a pH level of 0.5 to 2.5.

According to the present invention, SO$_4$ is also removed off by adding an SO$_4$ neutralizing agent to the liquid waste so that pH of the liquid waste can be adjusted to a pH level of 0.5 to 4.5 when a value of [Fe(+3) ion concentration]/[Ni ion concentration+Fe(+2) ion concentration] is 1 or less in the liquid waste.

When the value of [Fe(+3) ion concentration]/[Ni ion concentration+Fe(+2) ion concentration] exceeds 1 in the liquid waste, pH of the liquid waste may be adjusted to pH 1 or less by adding a reducing agent to the liquid waste.

Slaked lime [Ca(OH)$_2$], NaOH and KOH may be used as the SO$_4$ neutralizing agent.

One example of using the slaked lime as the SO$_4$ neutralizing agent will be described in detail, as follows.

In general, SO$_4$ in the waste acids is present in the form of H$_2$SO$_4$, FeSO$_4$, Fe$_2$(SO$_4$)$_3$, NiSO$_4$, etc.

When the slaked lime as the SO$_4$ neutralizing agent is added to an SO$_4$-containing solution, SO$_4$ is precipitated in the plaster form of $CaSO_4$, and therefore it is possible to remove the $SO_4$ off by filtering the $SO_4$-containing solution.

However, when the $SO_4$ is removed form the $SO_4$-containing solution by adding slaked lime as the $SO_4$ neutralizing agent, Fe and Ni are precipitated in the form of hydroxides, and therefore it is nearly impossible to separate these components from the precipitated plaster.

Accordingly, the present inventors have made ardent attempts and found that an $SO_4$ component and Fe/Ni components may be effectively separated from the waste acids by suitably adjusting a pH value in the solution, or a pH value and degree of oxidation, that is, a ratio of [Fe(+3) ion concentration]/[Ni ion concentration+Fe(+2) ion concentration]. Therefore, the present invention was completed on the basis of the above facts.

First, pH effects will be described in detail.

When slaked lime is added to a sulfuric acid (S), iron (Fe) and nickel (Ni)-containing solution (pH<0), $SO_4$ is precipitated.

When pH of the solution reaches pH 0.5 or more, the most of $SO_4$ in the form of sulfuric acid is precipitated in the form of plaster.

However, the metal (Fe and NI) ions and the plaster may be co-precipitated when pH of the solution is too high.

Therefore, pH of the liquid waste is preferably restricted to a pH level of 0.5 to 2.5 according to the present invention.

That is to say, when the slaked lime is added to the liquid waste until pH of the liquid waste is reduced below pH 2.5, only the plaster is precipitated, but Fe(+2), Ni and Fe(+3) ions are present in the form of ion phase without being precipitated.

Meanwhile, when a value of [Fe(+3) ion concentration]/[Ni ion concentration+Fe(+2) ion concentration] is 1 or less in the liquid waste, pH of the liquid waste is preferably restricted to a pH level of 0.5 to 4.5.

When an oxidizing agent such as hydrogen peroxide and nitric acid is present in the waste acids, a content of Fe(+3) is increased in the waste acids due to the high degree of oxidation. In this case, the increase in the content of Fe(+3) allows trivalent Fe ions to be precipitated in the form of Fe sludge such as FeOOH and $Fe(OH)_3$ in the vicinity of pH=2.5-4.5.

Since the Fe sludge is very fine and has high moisture content, Ni ion is coprecipitated or occluded into the Fe sludge although the Ni is present in the form of iron sludge, and therefore the loss of Ni is caused in the filtration of the Fe sludge.

Therefore, an iron hydroxide sludge having a strong ion occlusion should not be formed to enhance a recovery rate of the Ni ion.

That is to say, in the present invention, when the value of [Fe(+3) ion concentration]/[Ni ion concentration+Fe(+2) ion concentration] is 1 or less in the liquid waste, the precipitation of trivalent Fe ions in the form of Fe sludge such as FeOOH and $Fe(OH)_3$ should be suppressed with a decreasing content of Fe(+3).

In this case, the precipitation of Ni ion and Fe(+2) ion may be suppressed even when pH of the liquid waste is in a pH range of 2.5 to 4.5.

Therefore, the use of an oxidizing agent such as hydrogen peroxide in the waste acids should be inhibited as possible as it is.

As described above, when slaked lime is used as the $SO_4$ neutralizing agent, $SO_4$ is precipitated in the form of plaster. Therefore, it is possible to remove the $SO_4$ and simultaneously obtain a plaster by filtering the precipitate.

Preferably, the precipitated plaster should be filtered with a filter until the plaster is filtered to the dryness. However, since a small amount of water is inevitably incorporated into the sludge, and Ni and Fe ions are present in the aqueous solution, the sludge is filtered and dissolved in water, re-filtered to remove nearly all of the Fe and Ni ions (washing process).

When the washing solution is re-used in the subsequent neutralization process, the recovery rate of the plaster may be extremely enhanced.

In particular, when the precipitated plaster is subject to the washing process, the Fe and Ni ions are removed completely, which leads to the improved quality of the recovered plaster.

Then, Fe and Ni are precipitated in the form of hydroxide [$(Ni,Fe)(OH)_2$] when NaOH is added to the $SO_4$-free solution.

That is to say, when a sulfuric acid-soluble neutralizing agent, NaOH, is added to the $SO_4$-free Fe/Ni-containing solution, sulfuric acid is converted into water-soluble sodium sulfate, and Fe and Ni ions are converted in the form of hydroxides through the reaction represented by the following Equation 1.

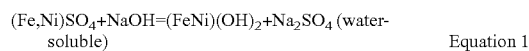

$$(Fe,Ni)SO_4 + NaOH = (FeNi)(OH)_2 + Na_2SO_4 \text{ (water-soluble)} \qquad \text{Equation 1}$$

Meanwhile, when NaOH or KOH is used as the $SO_4$ neutralizing agent, these components react with $SO_4$ ion to form $Na_2SO_4$ which is dissolved in the Fe/Ni-containing solution, but the Fe and Ni ions are precipitated in the form of hydroxides.

Then, the precipitate is washed with water.

Preferably, Ni—Fe ferrite is generated by blowing air or oxygen into the precipitate and reacting them prior to washing the precipitate.

That is to say, when air or oxygen is blown into the precipitate and reacted with the precipitate, the Ni—Fe ferrite represented by the following Equation 2 is generated as a black precipitate.

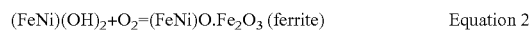

$$(FeNi)(OH)_2 + O_2 = (FeNi)O \cdot Fe_2O_3 \text{ (ferrite)} \qquad \text{Equation 2}$$

The Ni—Fe ferrite is preferably generated as described above. This is why the Ni—Fe ferrite has excellent filtering property, compared to the Fe/Ni hydroxides.

However, it is desirable to subject nickel hydroxide to a ferrite process by blowing air or oxygen into the precipitate, but the oxidation reaction may be omitted since the long reaction time is required for the complete ferrite processing of the nickel hydroxide.

An Ni/Fe-containing material, that is, Ni/Fe hydroxide or Ni—Fe ferrite is prepared by filtering and drying the washed Ni/Fe-containing sludge.

According to the present invention, a recovery rate of the Ni/Fe-containing material may reach 70% or more, and the Ni/Fe-containing material also includes 2.0% or less by weight of S.

The Ni/Fe-containing material prepared according to the present invention may be especially suitably used as a stainless steel-melting material since the Ni/Fe-containing material includes 2.0% or less by weight of S.

In this case, it is apparent that the Ni/Fe-containing material may be pulverized into powder, depending on the use of the Ni/Fe-containing material.

Also, the Ni/Fe-containing material [$(FeNi)(OH)_2$ or $(FeNi)O \cdot Fe_2O_3$] as prepared in the above is used to manufacture a ferronickel mass for stainless steel-melting materials in the present invention, and the manufacturing of the ferronickel mass is described in detail, as follows.

When the melting material is added to a furnace for the purpose of the use as the stainless steel-melting material, the melting material is scattered in the form of powder, and therefore it is necessary to agglomerate the melting material.

The content of the Fe/Ni-containing hydroxide synthesized through the above-mentioned wet neutralization reaction is varied according to the used materials, the Fe/Ni-containing hydroxide has an Ni content of 10% or more, and generally an Ni content of 10 to 20%, and the nickel hydroxide obtained by neutralizing an aqueous nickel solution has an Ni content of approximately 35 to 45%.

According to the present invention, a blended material is prepared by blending 10 to 20 parts by weight of a binder with the Ni/Fe-containing sludge prepared in the above, based on 100 parts by weight of the dry sludge. Then, the blended material is agglomerated into a ferronickel mass while adding moisture to the blended material.

The Ni/Fe-containing sludge includes an Ni/Fe-containing sludge manufactured by removing $SO_4$ by adding an $SO_4$ neutralizing agent to an Fe/Ni/$SO_4$-containing liquid waste so that pH of the Fe/Ni/$SO_4$-containing liquid waste can be maintained to a pH level of 0.5 to 2.5, precipitating Fe and Ni in the form of hydroxide [(Ni,Fe)(OH)$_2$] by adding NaOH to the $SO_4$-free solution, washing the precipitate with water, and drying the washed precipitate, or an Ni/Fe-containing sludge manufactured by removing $SO_4$ by adding an $SO_4$ neutralizing agent to an Fe/Ni/$SO_4$-containing liquid waste in which a value of [Fe(+3) ion concentration]/[Ni ion concentration+Fe (+2) ion concentration] is 1 or less, so that pH of the Fe/Ni/$SO_4$-containing liquid waste can be maintained to a pH level of 0.5 to 4.5, precipitating Fe and Ni in the form of hydroxide [(Ni,Fe)(OH)$_2$] by adding NaOH to the $SO_4$-free solution, washing the precipitate with water, and drying the washed precipitate.

As well as a cement binder, polyvinyl alcohol (PVA), molasses, starch and the like may be used as the agglomerating binder, and a blending ratio of the agglomerating binder is preferably in a range from 10 to 20 parts by weight, based on 100 parts by weight of the dry sludge. This is why the strength of the Ni/Fe-containing material is low when the blending ratio of the binder is less than 10 parts by weight, and a concentration of Ni is low when the blending ratio of the binder exceeds 20 parts by weight.

Among the agglomerating binder, the cement binder is desirable in an economical aspect, and the cement binder includes at least one selected from the group consisting of $3CaOSiO_2$, $2CaOSiO_2$, $3CaOAl_2O_3$ and $4CaOAl_2O_3$.

When the cement binder is used as the agglomerating binder, the blended material preferably includes 10 to 100 parts by weight of an austenitic stainless scale on the basis of 100 parts by weight of the dry sludge in addition to the cement binder.

The neutralized sludge generated through the wet reaction is completely sintered and dried to convert the hydroxide into its oxides, and thus to manufacture a ferronickel mass. However, the ferronickel mass prepared thus has a low short-term curing strength and a high initial moisture content.

This is why the neutralized sludge generated through the wet reaction has a high specific surface area since the neutralized sludge is fine and its OH group is reduced into water and exuded from the sludge in the subsequent sintering process, which leads to the formation of pores inside the sludge.

From the copious experiments, the present inventors have found the fact that, when a test sample having a high specific surface area is agglomerated by adding an increasing amount of moisture, the test sample that is subject to the agglomeration process has a high moisture content and a low short-term curing strength due to the increasing amount of moisture.

Therefore, the use of additives having a high particle size and excellent cementation reactivity are required to improve the strength of the Ni-containing sludge synthesized through the wet reaction.

The present inventors have also found that an Ni-containing scale is very effectively used as the blending agent to improve the short-term strength, the Ni-containing scale being formed in processing an austenitic stainless steel product (so-called, 300-Series stainless steel).

The austenitic stainless scale is the most preferably an Ni-containing stainless scale that is generated in the shot blast process of hot-rolled stainless steel products, or in the descaling process of hot-rolled stainless steel products using high-pressure water.

Although the austenitic stainless scales are varied according to the scale-generating process, but one representative example of the austenitic stainless scales is preferably an austenitic stainless scale including 2 to 6% by weight of Ni, 6 to 15% by weight of Cr, 30 to 60% by weight of Fe, and the balance of oxygen and other impurities.

Since the austenitic stainless scale includes 2 to 6% by weight of Ni, a blending ratio of Ni may be increased without reducing an Ni content in the ferronickel mass, which makes it possible for the ferronickel mass to secure a high curing strength in the short term of time.

In this case, the short-term curing strength means a curing strength within 5 days.

In particular, the stainless scale includes Fe and Cr components that are helpful to the cement curing reaction. Therefore, the stainless scale is very effectively used as the blending agent to improve the short-term curing strength since the stainless scale may facilitate the cementation reaction when the stainless scale is mixed with a fine wet sludge and cured, and also form channels through which water added during the agglomeration process is discharged due to the large particle size of the fine wet sludge.

A blending ratio of the stainless scale to the sludge generated through the wet reaction is preferably in a range of 10 to 100 parts by weight, based on 100 parts by weight of the dry sludge.

When the blending ratio of the stainless scale is less than 10 parts by weight, the short-term curing strength of the ferronickel mass is not improved sufficiently. On the contrary, when the blending ratio of the stainless scale exceeds 100 parts by weight, the short-term curing strength of the ferronickel mass is not improved any more by the addition of the stainless scale, and the addition of the stainless scale results in the reduction of Ni content, which leads to the reduction of the Ni content in the final ferronickel mass.

Meanwhile, the blended material preferably further includes a reducing agent, and a content of the reducing agent is preferably present in a content of 20 or less parts by weight, based on 100 parts by weight of the dry sludge.

The reducing agent functions to reduce FeNi oxides into metallic FeNi in a stainless steel melting furnace, and examples of the reducing agent include carbon, metallic aluminum, ferrosilicon, etc.

When the reducing agent is not blended in the ferronickel mass, it is possible to manufacture the metallic FeNi by reducing the FeNi oxides with a reducing gas such as hydrogen.

When the reducing agent is blended in an amount exceeding 20 parts by weight on the basis of 100 parts by weight of the dry sludge, the additional increase in reduction rate is difficult and the cost of the reducing agent is increased by the addition of the reducing agent. Therefore, it is preferred to limit a blending ratio of the reducing agent to a range of 20 or less parts by weight on the basis of 100 parts by weight of the dry sludge.

When the reducing agent is blended in the ferronickel mass, the reduction reaction in which the reducing agent reduces FeNi oxides into metallic FeNi is represented, as follows.

$$(FeNi)O + C = FeNi + CO \quad \text{Equation 3}$$

$$(FeNi)O + Al = FeNi + Al_2O_3 \quad \text{Equation 4}$$

$$(FeNi)O + FeSi = 2FeNi + SiO_2 \quad \text{Equation 5}$$

In order to manufacture the ferronickel mass according to the present invention, the blended material prepared thus is agglomerated by adding moisture to the blended material.

The agglomeration method includes a pelletizing method, a briquetting method, an agglomeration method using an extruder, etc.

When the pelletizing method is used as the agglomeration method, moisture is added in an amount of 10 to 30% by weight based on the total blended material. In the case of the briquetting method, moisture is preferably used in an amount of 10 to 20% by weight based on the total blended material.

The Ni content in the agglomerated ferronickel mass is preferably present in a content of 4% by weight or more, and more preferably 8% by weight or more.

That is to say, the Ni content in the ferronickel mass is preferably present in a content of 4% by weight or more in the aspect of supply, and preferably present in a content of 8% by weight or more in consideration of the value of a product.

MODE FOR THE INVENTION

Hereinafter, exemplary embodiments of the present invention will be described in more detail.

EXAMPLE 1

Hydrogen peroxide as an oxidizing agent and sodium thiosulfate as a reducing agent were added to 1 kg of waste acids (containing 15 g of Ni) including 1.5% of Ni, 4.5% of Fe and 35% of $SO_4$ generated in the process of manufacturing diamond to prepare an aqueous solution whose degree of oxidation is adjusted so that a value of [Fe(+3) ion concentration]/[Ni ion concentration+Fe(+2) ion concentration] can be in a range of 0.1 to 3.

$SO_4$ was neutralized and precipitated to form a plaster sludge while changing pH of the solution until the pH of the solution becomes pH 0.3 to 5.0 by adding an alkaline solution (including 5% of slaked lime) dropwise to the aqueous solution.

When the plaster sludge was formed in the aqueous solution, the plaster sludge was filtered with a solid/liquid separator, and a 2 mole sodium hydroxide solution was added to the plaster sludge-free filtrate to precipitate Fe and Ni in the form of hydroxide at pH 10.0, which forms an Fe/Ni hydroxide sludge.

The air was blown into the Fe/Ni hydroxide sludge for 10 minutes to induce the synthesis of Fe/Ni ferrite.

Then, 3 L of water (6 L of washing water in the case of Inventive material 6) was added to the sludge in which the Fe/Ni ferrite is synthesized, and dissolved metal ions such as sodium were washed, and the resulting ferrite powder was filtered, dried and weighed. Contents of Ni, Fe and S in the weighed test sample were measured using an energy dispersive spectroscopy (EDX).

From the measurement results, an amount of recovered Ni was calculated, and a recovery rate of Ni was determined by comparing the amount of recovered Ni with an amount of Ni (15 g) in the waste acids including Ni, Fe and $SO_4$ as the reaction materials.

The reaction conditions of the ferrite powder containing the recovered Fe and Ni, and the components and recovery rate of the components are summarized in the following Table 1.

TABLE 1

| Example No. | $SO_4$ Neutralizing agent | Metal ion neutralizing agent | [Fe(+3) ion Conc.]/ [Ni ion Conc. + Fe(+2) ion Conc.] | $SO_4$ Removal pH | Ni Recovery rate | Ni + Fe Content (%) | S Content (%) |
|---|---|---|---|---|---|---|---|
| Comparative material 1 | Ca(OH)$_2$ | NaOH | 3 | 3.0 | 25% | 40 | 0.5 |
| Comparative material 2 | Ca(OH)$_2$ | NaOH | 2 | 3.0 | 33% | 41 | 0.8 |
| Inventive material 1 | Ca(OH)$_2$ | NaOH | 1 | 3.0 | 71% | 42 | 0.8 |
| Inventive material 2 | Ca(OH)$_2$ | NaOH | 0.25 | 3.0 | 88% | 44 | 0.5 |
| Comparative material 3 | Ca(OH)$_2$ | NaOH | 0.25 | 5 | 53% | 40 | 0.4 |
| Inventive material 3 | Ca(OH)$_2$ | NaOH | 0.1 | 2.0 | 95% | 55 | 1.0 |
| Inventive material 4 | Ca(OH)$_2$ | NaOH | 2 | 1.0 | 94% | 54 | 1.5 |
| Comparative material 4 | Ca(OH)$_2$ | NaOH | 0.25 | 0.3 | 95% | 33 | 2.2 |
| Inventive material 5 | Ca(OH)$_2$ | NaOH | 0.25 | 2.0 | 95% | 51 | 1.2 |
| Inventive material 6 | NaOH | NaOH | 0.25 | 2.0 | 93% | 41 | 1.0 |
| Comparative material 5 | Ca(OH)$_2$ | Ca(OH)$_2$ | 0.25 | 2.0 | 99% | 15 | 10.1 |

As listed in the Table 1, it was revealed that, when only the slaked lime was used as the neutralizing agent as in Comparative material 5, $SO_4$, Fe and Ni metal ions were co-precipitated with a recovery rate of 99%, but the recycling value of the sludge is very low since a large amount of S component is incorporated into the sludge and Fe and Ni concentrations are relatively low.

Meanwhile, it was revealed that water-soluble sodium sulfate anhydrous ($Na_2SO_4$) was formed when NaOH was used as the neutralizing agent as in Inventive material 6, and therefore the recovery rate of Ni is good and the metal components are rich.

However, a large amount of the washing waster is required since NaOH is expensive and the water-soluble sodium sulfate anhydrous ($Na_2SO_4$) is generated in a large amount.

Therefore, it might be seen that the $SO_4$ precipitation is more preferably carried out using the slaked lime, and the metal precipitation is also more preferably carried out using NaOH according to the present invention.

Meanwhile, when a value of [Fe(+3) ion concentration]/[Ni ion concentration+Fe(+2) ion concentration] is greater than 1 as in Comparative materials 1 and 2, a content of Fe(+3) is increased due to the high degree of oxidation. In this case, when the content of Fe(+3) is increased in the waste acids, the most of trivalent Fe ions are precipitated in the form of Fe sludge such as FeOOH and $Fe(OH)_3$ in the vicinity of pH=2.5-4.5. The Fe sludge Since the Fe sludge is very fine and has high moisture content, Ni ion is co-precipitated or occluded into the Fe sludge although the Ni is present in the form of ion, and therefore the loss of Ni is caused in the filtration of the Fe sludge.

Also, when the pH of the liquid waste is adjusted to pH 4.5 as in Comparative material 3, the Ni component is directly precipitated, which leads to the poor recovery rate of Ni.

Also, when the pH of the liquid waste is too low to precipitate sulfuric acid as in Comparative material 4, a sufficient amount of the sulfuric acid is not precipitated and removed off, expensive NaOH is increasingly consumed, an S content is rather increased in subsequent products, and other impurities such as magnesium are a little incorporated into Fe/Ni oxides. Therefore, the liquid waste should be washed with a large amount of water.

On the contrary, when the value of [Fe(+3) ion concentration]/[Ni ion concentration+Fe(+2) ion concentration] exceeds 1 as in Inventive materials 1 to 6, the reducing agent such as sodium thiosulfate is added to the liquid waste so that the value of [Fe(+3) ion concentration]/[Ni ion concentration+Fe(+2) ion concentration] can be maintained to 1 or less, or pH of the liquid waste can be maintained to a pH level of 0.5-4.5 or a pH level of 2.5 or less, thus to prevent the precipitation of Fe ions.

Meanwhile, the Fe/Ni-containing sludges of the Inventive materials 1 to 6 and the sludge of the Comparative material 5, all of which are prepared under the conditions as listed in Table 1 of the Example 1, were dried, the dried sludges were pulverized into powders. Coke as the reducing agent was added to each of the pulverized powders, and a cement binding agent was used to prepare spherical pellets while adding moisture to the pulverized powders in a pelletizer.

The prepared pellets were cured, and reduced in a stainless steel electric furnace stimulator to obtain ferronickel metals. The Inventive materials 1 to 6 showed good characteristics as the stainless steel melting material.

However, the Comparative material 5 should be subject to the separate desulfurization process since a ferronickel mass includes a large amount of S component due to the high content of the S component in the Fe/Ni-containing sludge. As seen from the Table 1, it was revealed that the use as the stainless steel material is difficult since the recovery rate of metal is low and slag is highly formed due to the low concentration of Fe+Ni.

EXAMPLE 2

Inventive materials 7 and 8 were prepared in the same conditions as in the Inventive materials 2 and 4 of Example 1, respectively. That is to say, slaked lime was added to the liquid waste to precipitate a plaster. Then, the precipitated plaster was separately filtered, and then washed with an amount of water that is as much as 4 times the weight of the plaster in order to remove the remaining Ni and Fe ions. Then, the washed plaster was re-filtered. In this case, the washing solution was mixed with a filtrate obtained by filtering a plaster that is newly prepared in the same manner as in the Inventive materials 2 and 4. NaOH was added to the resulting mixture solution to precipitate Fe and Ni in the form of hydroxide, that is, in the form of $(Ni,Fe)(OH)_2$. (Inventive material 2-->Inventive material 7, Inventive material 4-->Inventive material 8)

The resulting test sample was filtered, dried and weighed. Then, contents of the components in the weighed test sample were measured using an energy dispersive spectroscopy (EDX).

From the measurement results, an amount of recovered Ni was calculated, and a recovery rate of Ni was determined by comparing the amount of recovered Ni with an amount of Ni (15 g) in the waste acids including Ni, Fe and $SO_4$ as the reaction materials. The results are listed in the following Table 2.

TABLE 2

| Example No. | $SO_4$ Neutralizing agent | Metal ion neutralizing agent | [Fe(+3) ion Conc.]/ [Ni ion Conc. + Fe(+2) ion Conc.] | $SO_4$ Removal pH | Ni Recovery rate |
|---|---|---|---|---|---|
| Inventive material 7 | $Ca(OH)_2$ | NaOH | 0.25 | 3.0 | 93% |
| Inventive material 8 | $Ca(OH)_2$ | NaOH | 2 | 1.0 | 99% |

As listed in the Table 2, it was revealed that the recovery rate of Ni is increased when compared to the Example 1, and Fe/Ni ions are also removed from the separately recovered plaster to obtain a recyclable plaster having a white color.

EXAMPLE 3

A Fe/Ni-containing sludge was prepared in the same conditions as in the Inventive material 2 of the Example 1, and the Fe/Ni-containing sludge was neutralized and dried to prepare a wet-process sludge.

Scales having 0% of Ni content (400-Series ferrite stainless scale), 3.2% of Ni content (300-Series austenitic stainless steel; obtained in the descaling process) and 4.5% of Ni content (300-Series austenitic stainless steel; obtained in the shot blast process), all of which were prepared in the shot blast process and descaling process of stainless steel, were mixed with the prepared sludge so that contents of the scales can be in a range from 10 to 120 parts by weight based on 100 g of the prepared sludge.

Also, a cement binder and carbon as a reducing agent were mixed with the sludge so that contents of the cement binder and the reducing agent can be in a range from 10 to 25 parts by weight and from 0 to 25 parts by weight, respectively, based on 100 g of the prepared sludge.

The blended material as prepared thus was homogenized in a mixer, and then palletized in a rotation plate of a pelletizer whiled adding water to the blended material.

The ferronickel pellet prepared thus was cured at intervals of 1, 3 and 5 days, and measured for strength and moisture content according to the curing periods. Also, The cured ferronickel pellet was completely cured, and the Ni content in the ferronickel pellet was then analyzed. The results are listed in the following Table 3.

parts by weight of the dry sludge (Test sample 6), the short-term curing strength of the ferronickel pellet is not improved properly, whereas, when the blending ratio of the stainless scale exceeds 100 parts by weight (Test sample 7), the short-term curing strength of the ferronickel pellet is not improved any more by the addition of the stainless scale, and the addition of the stainless scale results in the reduction in the Ni content, and therefore the final ferronickel pellet has a low Ni content.

Furthermore, it was revealed that, when the blending ratio of the binder is less than 10 parts by weight (Test sample 9), it is difficult to improve the curing strength of the ferronickel pellet, whereas the Ni content in the ferronickel pellet is low when the blending ratio of the binder exceeds 20 parts by weight (Test sample 10).

The invention claimed is:

1. A method of manufacturing an Fe/Ni-containing material from an Fe/Ni-containing liquid waste, comprising:
preparing an Fe/Ni/$SO_4$-containing liquid waste in which a value of [Fe(+3) ion concentration]/[Ni ion concentration +Fe(+2) ion concentration] is 1 or less;

TABLE 3

| Test sample No. | Wet-process sludge (Ni content) | Amount of added stainless scale/Ni content | Kind/Amount of added reducing agent | Amount of added cement binder | 1 day - Strength/ Moisture content | 3 day- Strength/ Moisture content | 5 day- Strength/ Moisture content | Ni content in final pellet |
|---|---|---|---|---|---|---|---|---|
| 1 | FeNi(OH)$_2$ (13%Ni) | — | C/10 | 15 | 8 kg/cm$^2$/33% | 15 kg/cm$^2$/28% | 24 kg/cm$^2$/22% | >8% |
| 2 | FeNi(OH)$_2$ (13%Ni) | 25 g/3.2% | C/10 | 15 | 19 kg/cm$^2$/22% | 35 kg/cm$^2$/15% | 45 kg/cm$^2$/10% | >8% |
| 3 | FeNi(OH)$_2$ (13%Ni) | 45 g/4.5% | C/10 | 15 | 25 kg/cm$^2$/20% | 41 kg/cm$^2$/12% | 65 kg/cm$^2$/8% | >8% |
| 4 | FeNi(OH)$_2$ (13%Ni) | 45 g/0% | C/10 | 15 | 24 kg/cm$^2$/21% | 39 kg/cm$^2$/11% | 64 kg/cm$^2$/8% | 7.5% |
| 5 | FeNi(OH)$_2$ (13%Ni) | 80 g/4.5% | C/10 | 15 | 28 kg/cm$^2$/20% | 45 kg/cm$^2$/11% | 78 kg/cm$^2$/7% | >8% |
| 6 | FeNi(OH)$_2$ (13%Ni) | 5 g/3.2% | C/10 | 15 | 10 kg/cm$^2$/31% | 17 kg/cm$^2$/25% | 29 kg/cm$^2$/21% | >6.9% |
| 7 | FeNi(OH)$_2$ (13%Ni) | 120 g/3.2% | C/10 | 15 | 29 kg/cm$^2$/19% | 45 kg/cm$^2$/11% | 78 kg/cm$^2$/7% | >6.9% |
| 8 | FeNi(OH)$_2$ (13%Ni) | 45 g/4.5% | —/0 | 15 | 27 kg/cm$^2$/20% | 43 kg/cm$^2$/11% | 66 kg/cm$^2$/8% | >8% |
| 9 | FeNi(OH)$_2$ (13%Ni) | 80 g/4.5% | C/10 | 5 | 9 kg/cm$^2$/36% | 18 kg/cm$^2$/27% | 19 kg/cm$^2$/22% | >8% |
| 10 | FeNi(OH)$_2$ (13%Ni) | 100 g/3.2% | C/10 | 25 | 28 kg/cm$^2$/20% | 44 kg/cm$^2$/11% | 69 kg/cm$^2$/8% | 7.0% |

As seen from the Table 3, it was revealed that, when the stainless scale is not mixed with the sludge (Test sample 1), the ferronickel pellet has a short-term curing strength (within 1 to 5 days) lower than the minimum standard strength (40 kg/cm$^2$) that is required to add the ferronickel pellet into an electric furnace. In general, it is necessary to cure the ferronickel pellet for 15 to 30 days so as to satisfy requirement of the minimum standard strength.

Meanwhile, it was revealed that, when a suitable amount of the stainless scale is mixed with the sludge (Test samples 2 to 5, 7, 8 and 10), the ferronickel pellet has an excellent short-term curing strength.

However, it was revealed that, when the Ni-free stainless steel, that is, a ferrite (400-Series) scale is mixed with the sludge (Test sample 4), the curing strength of the ferronickel pellet is a little improved by the addition of the Ni-free stainless steel, but the Ni content in the ferronickel pellet is low.

Also, it was revealed that, when the blending ratio of the stainless scale is less than 10 parts by weight based on 100 removing $SO_4$ from the liquid waste by adding an $SO_4$ neutralizing agent to the liquid waste so that pH of the liquid waste is maintained to pH 0.5 to 4.5;
precipitating Fe and Ni in the form of hydroxide [(Ni,Fe)(OH)$_2$] by adding NaOH to the $SO_4$-free solution;
washing the precipitate with water; and
manufacturing an Ni/Fe-containing material by filtering and drying the washed precipitate.

2. The method of claim 1, wherein the $SO_4$ neutralizing agent is at least one selected from the group consisting of slaked lime [Ca(OH)$_2$], NaOH and KOH.

3. The method of claim 2, wherein the recovery rate of the Ni/Fe-containing material is 70% or more, and a content of S in the Ni/Fe-containing material is 2.0% by weight or less.

4. The method of claim 1, wherein the removing of the $SO_4$ from the liquid waste comprises: precipitating $SO_4$ with a plaster by adding slaked lime [Ca(OH)$_2$] as the $SO_4$ neutralizing agent to the liquid waste; and removing the $SO_4$ by filtering the liquid waste.

5. The method of claim 4, wherein the recovery rate of the Ni/Fe-containing material is 70% or more, and a content of S in the Ni/Fe-containing material is 2.0% by weight or less.

6. The method of claim 1, further comprising: generating an Ni—Fe ferrite by blowing air or oxygen into the precipitate prior to washing the precipitate.

7. The method of claim 6, wherein the recovery rate of the Ni/Fe-containing material is 70% or more, and a content of S in the Ni/Fe-containing material is 2.0% by weight or less.

8. The method of claim 1, wherein a recovery rate of the Ni/Fe-containing material is 70% or more, and a content of S in the Ni/Fe-containing material is 2.0% by weight or less.

9. A method of manufacturing a ferronickel mass using an Fe/Ni-containing sludge manufactured through a wet reaction, comprising:

preparing a blended material by blending an Ni/Fe-containing sludge manufactured by removing $SO_4$ by adding an $SO_4$ neutralizing agent to an Fe/Ni/$SO_4$-containing liquid waste in which a value of [Fe(+3) ion concentration]/[Ni ion concentration +Fe(+2) ion concentration] is 1 or less, so that pH of the Fe/Ni/$SO_4$-containing liquid waste is maintained to a pH level of 0.5 to 4.5, precipitating Fe and Ni in the form of hydroxide [(Ni,Fe)(OH)$_2$] by adding NaOH to the $SO_4$-free solution, washing the precipitate with water, and drying the washed precipitate, and 10 to 20 parts by weight of a binder and 20 parts by weight or less of a reducing agent on the basis of 100 parts by weight of the dry sludge; and agglomerating the blended material while adding moisture to the blended material.

10. The method of claim 9, wherein the binder is at least one selected from the group consisting of cement, polyvinyl alcohol (PVA), molasses and starch.

11. The method of claim 10, wherein the agglomerating of the blended material is carried out in one of a pelletizing method, a briquetting method, and an agglomeration method using an extruder.

12. The method of claim 9, wherein the reducing agent is at least one selected from the group consisting of carbon, metallic aluminum and ferrosilicon.

13. The method of claim 12, wherein the agglomerating of the blended material is carried out in one of a pelletizing method, a briquetting method, and an agglomeration method using an extruder.

14. The method of claim 9, wherein the agglomerating of the blended material is carried out in one of a pelletizing method, a briquetting method, and an agglomeration method using an extruder.

* * * * *